United States Patent [19]

Kruegle

[11] 3,709,610

[45] Jan. 9, 1973

[54] METHOD AND APPARATUS FOR MEASURING AND CONTROLLING THE THICKNESS OF A FILAMENT OR THE LIKE

[75] Inventor: Herman A. Kruegle, River Vale, N.J.

[73] Assignee: Holobeam, Inc., Paramus, N.J.

[22] Filed: May 20, 1970

[21] Appl. No.: 38,968

[52] U.S. Cl. ..................356/160, 356/111, 356/69
[51] Int. Cl......G01b 11/04, G01b 9/02, G01b 11/24
[58] Field of Search...........356/69, 159, 106, 71, 160

[56] References Cited

UNITED STATES PATENTS 3,518,007  6/1970  Ito..........................................356/162
3,503,687  3/1970  Venema...............................356/106

*Primary Examiner*—Ronald L. Wibert
*Assistant Examiner*—Conrad Clark
*Attorney*—Sandoe, Hopgood and Calimafde

[57] ABSTRACT

A light beam, such as that obtained from a laser, is irradiated onto a fine filament of wire, yarn or the like to produce a diffraction pattern. The spacing between the light and dark portions of the diffraction pattern is measured to provide an indication of the diameter of the filament. Several means for measuring the diffraction pattern spacing are disclosed. Also disclosed is a method of utilizing an interference pattern produced by irradiating a sharp edge with a light beam, thereby to evaluate the edge sharpness.

2 Claims, 17 Drawing Figures

INVENTOR.
Herman A. Kruegle

BY

Sandoe, Hopgood & Calimafde
ATTORNEYS

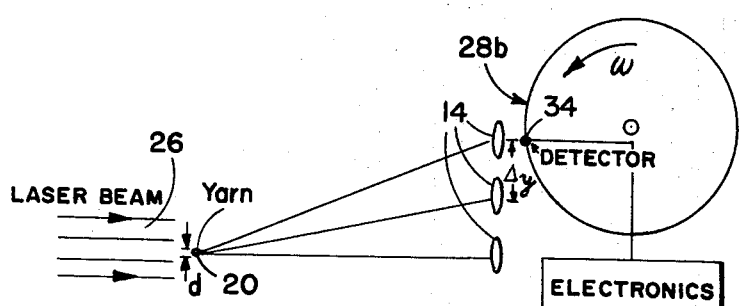
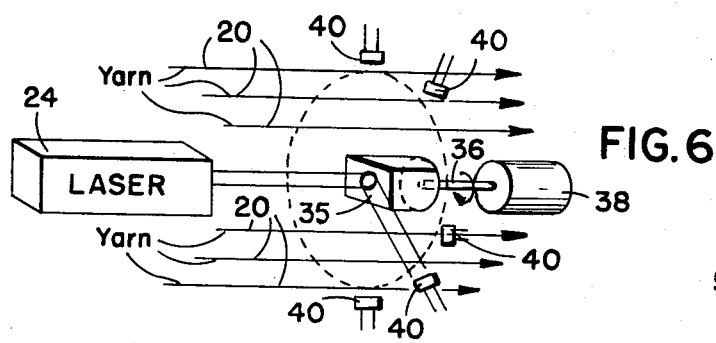
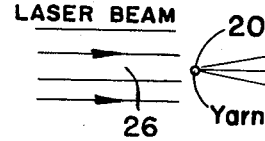
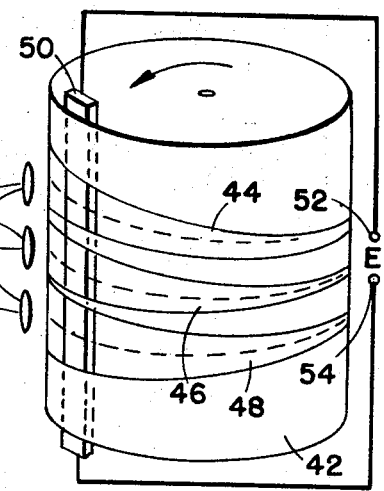
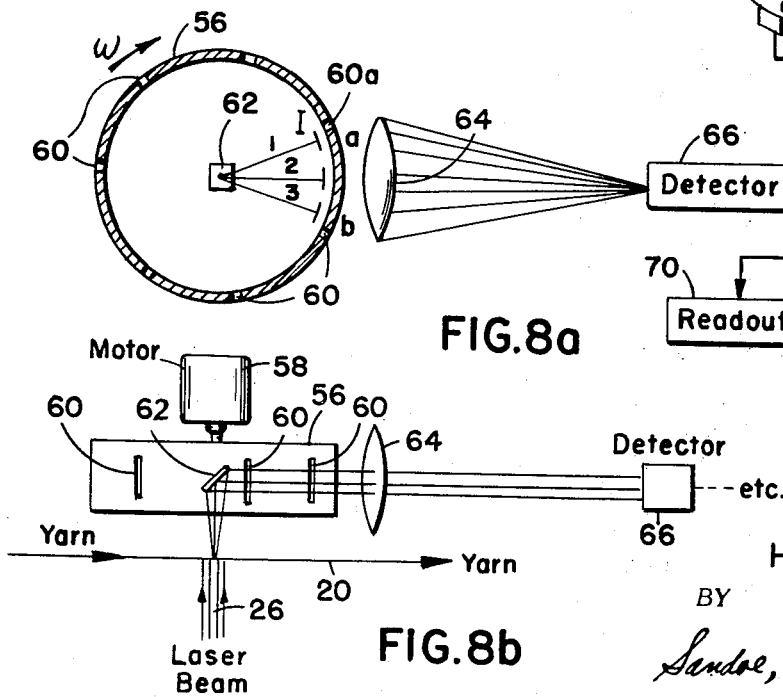

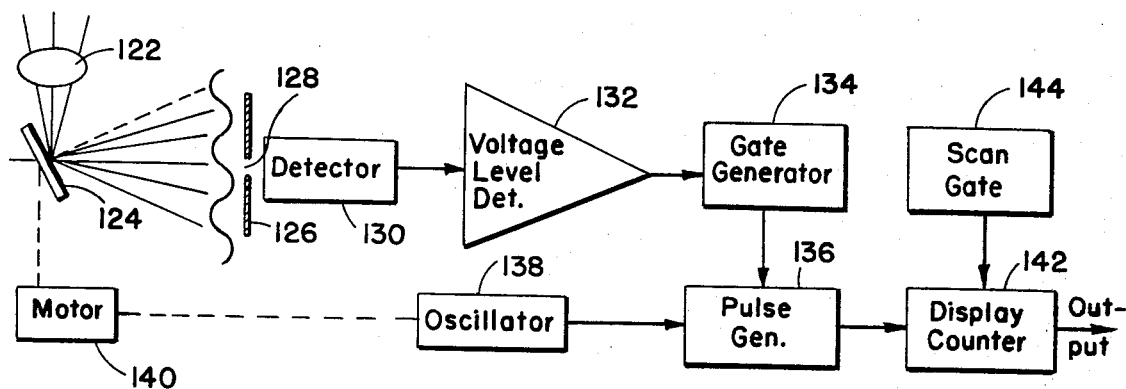
FIG.13
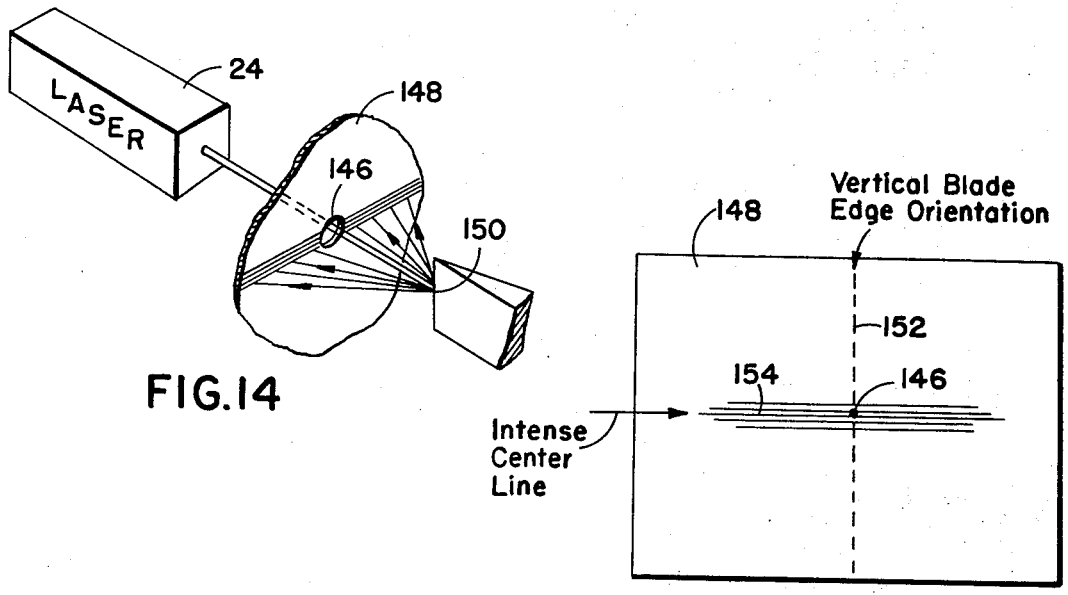
FIG.14
FIG.15
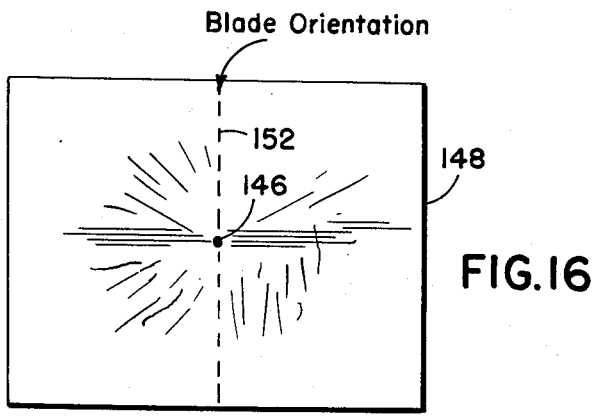
FIG.16

METHOD AND APPARATUS FOR MEASURING AND CONTROLLING THE THICKNESS OF A FILAMENT OR THE LIKE

The present invention relates to a method and apparatus for measuring the diameter of a yarn or wire filament, or the like.

It is often necessary to be able to measure the diameter of a fine wire, yarn, filament or the like, particularly during the manufacturing process of such articles. For example, in the process of forming fine yarn having a predetermined denier or diameter, the yarn is extruded from a molten supply of thermo-plastic material such as by a spinerette, from which the material is then removed at a specified rate and collected at a suitable take-up roll. Thus, measurement of the yarn thickness usually must be made while the yarn is moving between its initial forming station and its eventual collection station. Similarly, in the fabrication of fine wire, it is usually necessary to maintain the diameter of the wire to within close tolerances. The wire fabricating process is often complicated by a requirement that the wire be coated with a suitable insulating material wherein it is necessary to maintain the overall diameter of the raw wire and its coating to within a precisely specified measurement. As in the case of yarn, measurement of the wire diameter usually must be made while the wire is in motion between its various stages of formation and collection.

Several approaches have generally been taken in the measurement of the diameter of fine diameter filaments. The first of these is essentially mechanical in nature and generally includes the use of a feeler device which contacts the moving filament to provide the diameter measurement. The deficiencies of measurement devices of the feeler type primarily result from the difficulty in providing sufficiently fine feeler devices for use with correspondingly fine or narrow filaments, and because the contact of the feeler and the filament may cause a distortion in the shape and dimension of the filament. Another approach used in the textile industry is to measure the weight of a known length of yarn having a known specific gravity. The result is expressed in deniers. The difficulty with this method is that it is time consuming and not "real time." Another method is by use of a capacitometer in which the sensor responds to the volume of dielectric material (yarn) between two capacitor plates. This method is inaccurate since the measurement obtained is a function of water vapor content. Another method is to measure the attenuation of beta rays caused when the yarn is put between the source of beta rays, and the beta ray sensor. This method too is not sufficiently accurate. Another basic approach to the measurement of filament involves the use of a light beam in combination with an optical measuring system which may be characterized as non-contacting in nature, that is, no mechanical device is used to contact the filament. While this approach avoids some of the problems resulting from the mechanical systems, the optical systems are usually highly complex in nature, and do not readily lend themselves to the measurement of extremely fine diameter filaments as a result of errors introduced in the measurement, as a result of noise signals, and the like. Errors in measurement may also be introduced in both the contacting and non-contacting systems as a result of relatively minor lateral movement of the filament as it passes through the measurement system.

It is an object of the present invention to provide an improved apparatus and method for measuring the diameter of a filament.

It is another object of the present invention to provide an apparatus and method for measuring filament diameter with great accuracy.

It is a further object of the present invention to provide a method and apparatus for measuring the diameter of a moving filament in which the filament is not contacted during the measurement operation, and in which the diameter is extremely accurate even for relatively fine or small diameter filaments.

It is another object of the present invention to provide an apparatus and a method for measuring the diameter of a filament of the type described in which the result of the measurement can be readily provided and which can be used to control the filament forming operation if desired.

It is a general object of the invention to provide an apparatus and a method for measuring the diameter of a small diameter moving filament by use of a relatively uncomplicated and reliable system which provides measurements of high accuracy and repeatability.

Broadly considered, the present invention provides a method and apparatus for measuring the diameter of a filament in which a light beam is caused to be incident of the filament, to thereby provide a diffraction pattern comprising alternating dark and light areas. By measuring the spacing between corresponding ones of these dark or light areas, an accurate determination of the diameter of the filament can be made by solving an equation in which the only unknown is the filament thickness. The other factors in that equation which are known include the bandwidth of the incident light beam, and the distance of the filament from the plane on which the diffraction pattern is formed.

Disclosed herein are several examples of means for accurately detecting or sensing the spacing between the diffraction pattern areas. Also disclosed is a system for measuring the thickness of an insulating coating formed on a wire, and for controlling the coating process in response to the measurement of the combined diameter of the wire and the coating.

The present invention further discloses the use of a laser light beam in the testing of the sharpness of an edge such as on a blade or a needle, by irradiating the sharpened edge with a laser beam and detecting the interference pattern produced as a result of that radiation. For a relatively sharp edge, the interference pattern produced is uniform in nature and has clearly defined dark and light patterns, while for a relatively dull edge, the diffraction or interference pattern is irregular and spread out in a non-uniform manner. The interference pattern may be used either to monitor the edge sharpening operation or, if desired, to control the sharpening operation upon the sensing of an interference pattern indicative of an insufficiently sharpened edge.

To the accomplishment of the above and to such other object as may hereinafter appear, the present invention relates to a method and apparatus for measuring the diameter of a filament or the like, substantially as defined in the appended claims, and as described in the following specification taken together with the accompanying drawings in which:

FIG. 5 is a schematic diagram illustrating a second detector for use in sensing the diffraction pattern in accord with the practice of the present invention;

FIG. 6 illustrates schematically yet another embodiment of a diffraction pattern sensing device for use in the practice of the present invention;

FIG. 7 is a view similar to FIGS. 4 – 6 illustrating yet another possible device for sensing the diffraction pattern obtained in the practice of the invention;

FIGS. 8a and 8b are, respectively, a side elevation and a plan view of yet another diffraction pattern sensing device for use in the practice of the invention;

Figure 9:
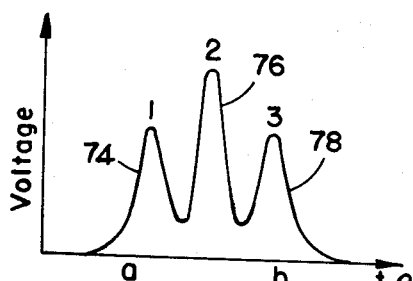
Figure 10:
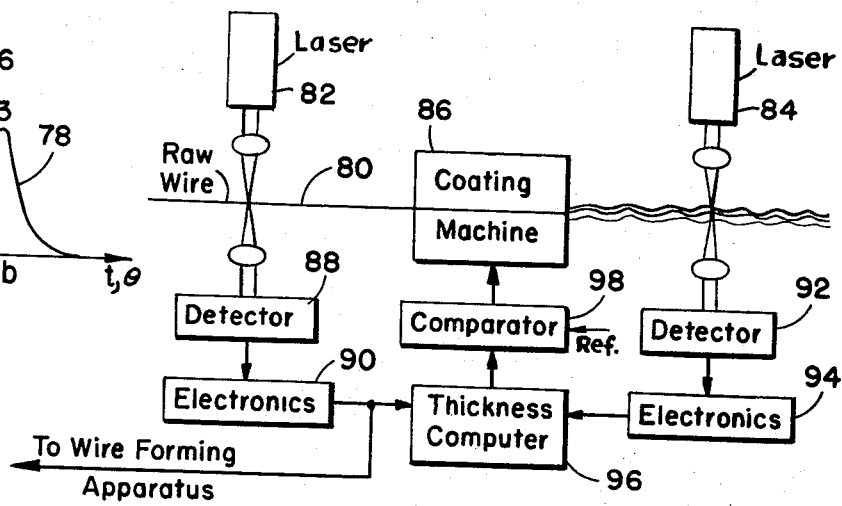
Figure 11:
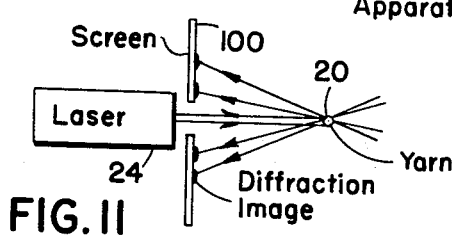
Figure 12:
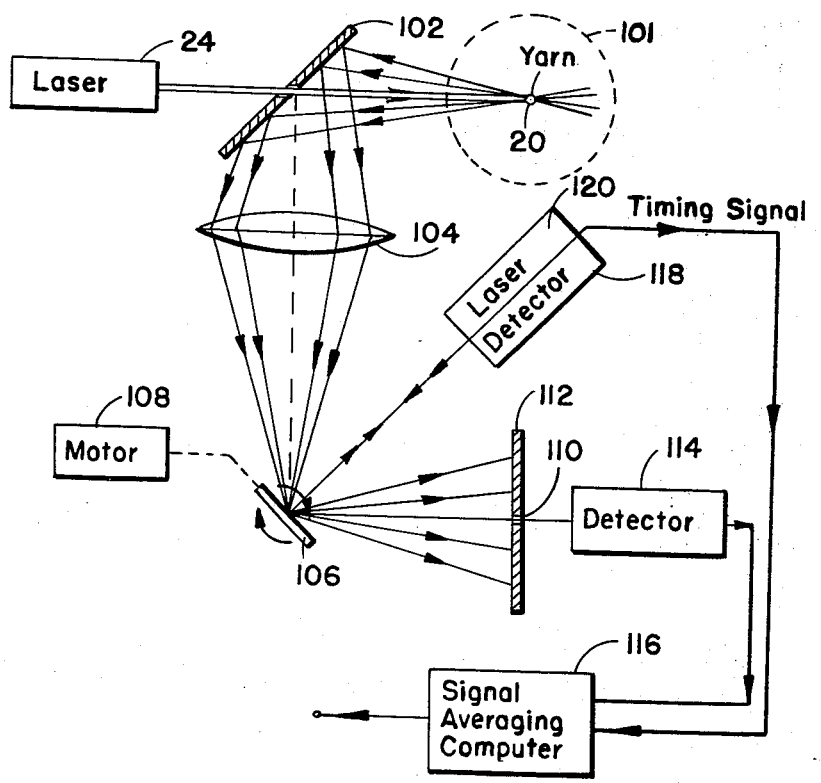

FIG. 9 graphically illustrates a typical signal derived from the diffraction pattern sensing device of FIG. 8;

FIG. 10 is a schematic diagram of an apparatus for measuring the diameter of a coated wire in which the principles of the present invention are employed;

FIG. 11 illustrates schematically a further embodiment of the present invention in which the diffraction pattern is obtained by the reflection of a beam from the filament;

FIG. 12 illustrates in schematic form a system for measuring the diameter of a filament using the basic principles of the embodiment of FIG. 11;

FIG. 13 illustrates schematically a further embodiment of the present invention;

FIG. 14 illustrates schematically the practice of the present invention in testing the sharpness of an edge;

FIG. 15 illustrates the diffraction pattern obtained from the apparatus of FIG. 14 for an edge having a high degree of sharpness; and FIG. 16 is a corresponding diffraction pattern obtained from the apparatus of FIG. 14 in which the edge being tested is relatively dull.

The method and apparatus of the invention make use of the diffraction pattern produced when a light beam is incident on a filament such as a yarn or wire, to provide a measurement of the diameter of the filament. By measuring the spacing between the dark and light areas of that diffraction pattern the diameter of the filament may be obtained by solving an equation in which the filament diameter is only unknown. This equation may be derived by an examination of the diffraction pattern produced by the system schematically illustrated in FIG. 1.

Figure 1:
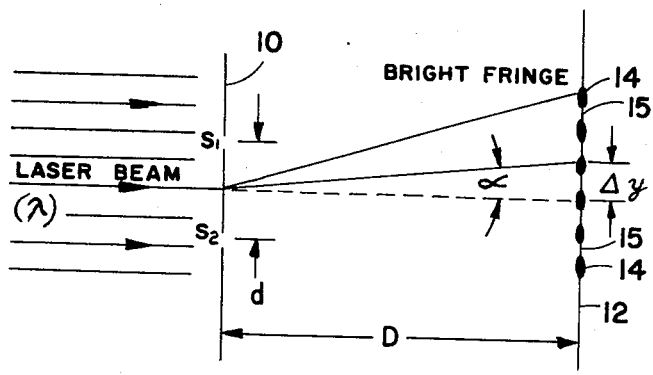
FIG. 1 is a schematic diagram illustrating a diffraction pattern obtained by passing a light beam through a narrow slit for the purpose of explaining the principles of the invention.

As illustrated in FIG. 1, a beam of light having a known wavelength $\lambda$ is incident upon a plane 10 in which two slots S1 and S2 vertically spaced by a distance d are formed. An image plane 12 is located at a distance D from plane 10 and as is known, a diffraction pattern, including a plurality of alternating bright regions 14 and dark regions 15, is produced on image plane 12 as a result of the passing of the light beam through those spaced slots. The distance between the adjacent bright regions 14 (and the dark regions 15) formed on image plane 12 is designated $\Delta y$.

From Braggs' law of diffraction it is known that $d \sin \alpha = m \lambda$ (1) where $m = 0, 1, 2, \ldots$, the multiple values of m representing the multiple spaced bright regions produced in the diffraction pattern, and $\alpha$ is the angle shown in FIG. 1 between the direction of the light beam and the diffraction pattern region. From an analysis of the geometry of FIG. 1, assuming that $\Delta y$ is substantially smaller than D, and $\tan \alpha$ is approximately equal to $\sin \alpha$, we obtain $\Delta y = D \sin \alpha$ (2).

Substituting for $\sin \alpha$ in equation (2), we then obtain $\lambda = d \Delta y / mD$ or $d = \lambda m D / \Delta y$ (3).

Thus, as indicated in equation (3), the distance of d between the slots S1 and S2 in plane 10 can be determined from a knowledge of $\Delta y$, the spacing between corresponding regions of the diffraction pattern, since the other variables in equation (3), that is $\lambda$, $m$ and $D$, are known.

Figure 2:
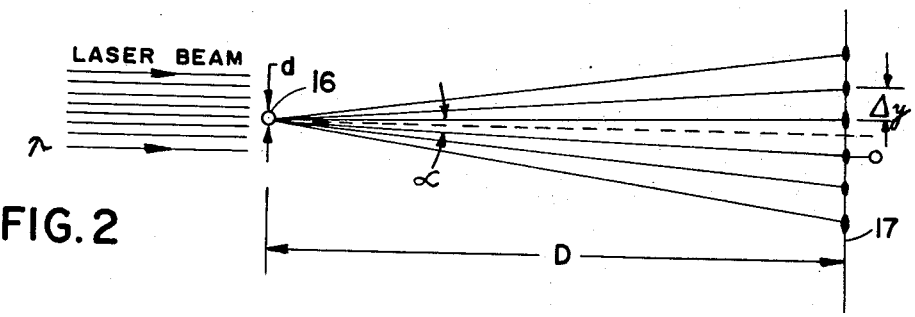
FIG. 2 is a schematic diagram similar to FIG. 1, illustrating the formation of a diffraction pattern by the irradiation of a filament with a laser beam to further illustrate the basic principle of the present invention.

The principles of the present invention as illustrated in FIG. 2 are based primarily on the above described phenomena in which the vertically spaced slots in plane 10 are replaced by the diameter of a filament, yarn or wire 16, on which a light beam having a wavelength $\lambda$ is incident to produce the diffraction pattern on screen 17 much in the manner as in FIG. 1. It is recognized that the diffraction phenomenon is more complicated than described above in the case of the yarn. This is so because the yarn is transparent and hence produces diffraction patterns caused by light that has (1) diffracted around the yarn filament (2) internally reflected through the yarn, and (3) reflected light from the surface of the yarn. The system of FIG. 2 thus represents in its most basic form, the use of a diffraction pattern to obtain the measurements of the diameter of filament 16 in accord with the present invention in which the yarn diameter is given by the expression in equation (3). It is noted that to solve equation (3) a knowledge of the wavelength $\lambda$ of the incident light beam is required to calculate the diameter of the filament. For this purpose it is preferable that the light beam used to form the diffraction pattern be monochromatic in nature and have a readily determinable wavelength, so that the light beam is advantageously obtained from a laser (not shown in FIG. 2), which produces an intense monochromatic beam of light as a known wavelength.

Figure 3:
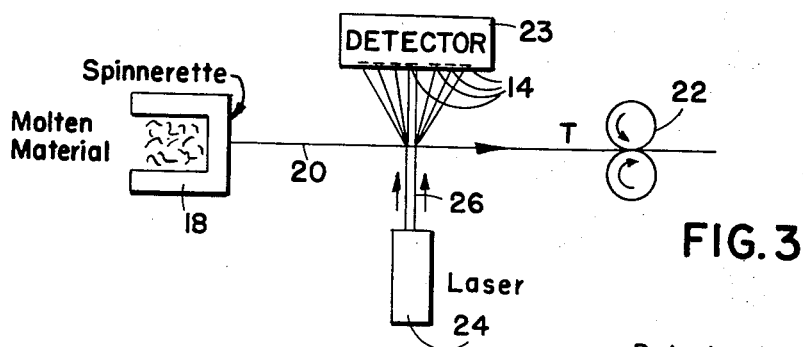
FIG. 3 is a schematic representation of a filament forming operation in which the diameter of the filament is measured in accord with the present invention.

FIG. 3 illustrates the practice of the present invention in the measurement of the diameter or thickness of a quantity of yarn as it is being produced. As is conventional, a quantity of molten thermoplastic material is processed in a spinerette 18 to produce a fine yarn 20 which is then passed between a pair of rollers 22, thereby to remove the yarn from spinerette 18 in a conventional manner. A laser 24 is positioned along the path of movement of yarn 20 and produces a light beam 26 which is incident upon yarn 20 in a direction perpendicular to its movement. Light beam 26 is interrupted by yarn 20, thereby to produce a diffraction pattern which is sensed at a detector 28 in which the spacing between the dark and bright regions of that diffraction pattern are measured. That spacing information is subsequently used to automatically compute the diameter of yarn 20 in accord with equation (3).

FIGS. 4 – 8 illustrate various types of detectors which can be employed in the practice of the present invention to measure the spacing between the bright and dark areas on the diffraction pattern. That information can then be converted into signals for use in computing the yarn diameter according to equation (3) by appropriate electronic computing circuitry of the type well known in the art and which is thus not more completely described in this application.

Figure 4:
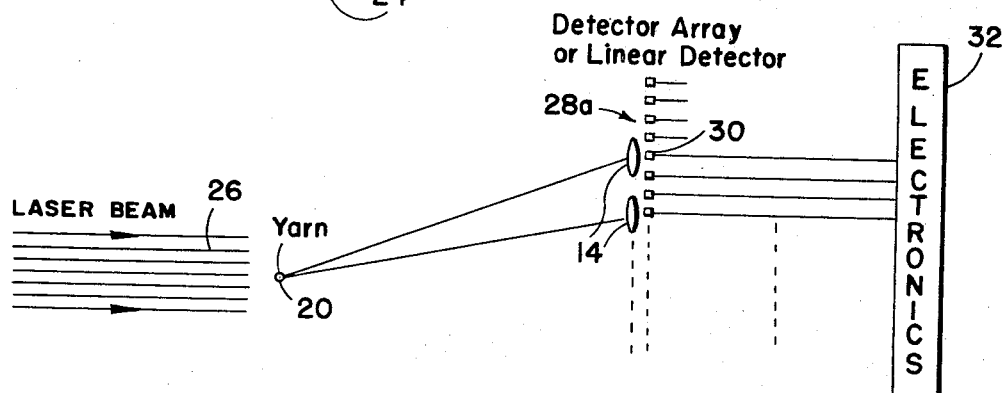
FIG. 4 is a detailed schematic diagram of the method and apparatus illustrated in FIG. 3 showing one embodiment of a diffraction pattern sensing device that can be used with the apparatus of FIG. 3.

For example, the detector 28a shown in FIG. 4 comprises an array of spaced, light-sensitive detectors 30 arranged along the plane of the diffraction pattern formed when laser beam 26 is incident upon yarn 20. The location of the bright and dark regions of that diffraction pattern determines which of detectors 30 are energized, or which part of a linear detector, which may be used instead of the array of individual light detectors 30, is irradiated by the diffraction pattern bright regions. That information can be converted into signals representative of the distance between these bright regions, which signals in turn are applied and processed in an electronic computing system generally designated 32 to provide the computed indication of the diameter of yarn 20 as desired. Computing system 32 may be modified along known lines to produce an output signal representative of the yarn diameter which could be applied to a process control system (not shown in FIG. 3) to control the yarn fabrication operation, thereby to maintain the yarn diameter at substantially its desired value.

In the embodiment of the invention shown in FIG. 5, the detector 28b is in the form of a scanning detector 34 which is caused to rotate past the plane of the diffraction pattern at a rate $w$. Since the angular velocity of detector 34 is known, the spacing $\Delta y$ between the bright regions 14 on the diffraction pattern corresponds to the time interval between the detection of the adjacent bright regions. That time interval can be converted, by any suitable means known in the art, into a signal proportional to $\Delta y$, that signal in turn then being processed in computing system 32 as indicated above, to compute the thickness of the yarn.

The system illustrated in FIG. 6 is useful for obtaining measurement of the diameters of a plurality of yarns 20 by the use of a single beam derived from laser 24. That beam is incident upon a rotating mirror 35 connected to a shaft 36, which in turn is caused to rotate by a motor 38. The rotating mirror 35 causes the laser beam to be scanned in a circular plane perpendicular to the longitudinal axes of the yarns, thus causing the diffraction patterns to be produced across a plurality of detectors 40 positioned behind their respective yarns 20. Detectors 40 sense the spacing between the bright regions of the diffraction patterns formed by the incidence of the rotating laser beam on their respective yarns, to produce in a manner similar to that described above, suitable signals for computing the respective yarn diameters.

In the embodiment of FIG. 7, the diffraction pattern spacing detector is in the form of a rotating drum 42 having a series of spaced, tapered openings 44–48 formed about its outer periphery. A fixed linear detector 50 is positioned in the interior of drum 42 in alignment with the diffraction pattern formed by the interference of the laser beam 26 by yarn 20. The vertical dimensions of the tapered openings vary substantially linearly along their extent so that as drum 42 rotates past the diffraction pattern, a continuously varying vertical opening is provided immediately behind the diffraction pattern.

Linear detector 50 receives images through these openings and has its upper and lower ends respectively connected to terminals 52 and 54 across which a voltage E is developed. That voltage is proportional to the light incident upon detector 50, and as drum 42 rotates, voltage E will vary and be at a maximum when the instantaneous spacing between the bright regions 14 of the diffraction pattern equals or matches the vertical spacing between tapered openings 44–48 on drum 42. The sensing of a maximum voltage $E_{max}$ thus corresponds to a unique rotational position of drum 42 and one value of vertical spacing between the tapered openings. That value in turn represents the spacing between the bright regions of the diffraction pattern which information may be utilized and computed as described above to obtain a precise measurement of the yarn diameter.

FIGS. 8a and 8b are respectively elevation and plan views of a system for detecting the spacing between the bright spots on the diffraction pattern in which the detector is in the form of a rotating cylinder 56 which is caused to rotate at an angular velocity $w$ by a motor 58. A plurality of spaced axial, narrow slits 60 are formed in the wall of cylinder 56. The diffraction pattern produced by the interference of the yarn on the incident laser beam is caused to be incident on a mirror 62 to produce an image of the diffraction pattern on the interior surface of cylinder 56. A lens 64 is positioned external to cylinder 56 intermediate rotating slots 60 and a detector 66, the output of which is connected to a computing system 68. Detector 66 senses, in a manner described below, the spacing between the bright regions on the reflected diffraction pattern and applies that information to computer system 68 for calculating with great accuracy the diameter of yarn 20 as indicated above. The output of computing system 68 may be applied to a visual read-out 70 which may be advantageously a photo-tube, digital display or the like, to provide a readily comprehended indication of the yarn diameter.

A signal proportional to the yarn diameter may also, as shown in FIG. 8a, be applied to the control portion of a feedback control network 72 where it is compared to a reference signal to produce an error or control signal. The latter signal is then processed in a known manner to vary the yarn processing operation, to thereby maintain the yarn diameter substantially at its desired value.

In the operation of the system of FIG. 8, as cylinder 56 rotates, and slit 60a moves from position $a$ to position $b$ (FIG. 8a), the output voltage of detector 66 will be a function of the image intensity of the diffraction pattern as illustrated by the waveforms shown in FIG. 9 in which the three peaks 74, 76 and 78 respectively correspond to the image positions 1, 2 and 3 shown in FIG. 8a. That waveform can be analyzed in computer system 68 along with the known value of w, the angular velocity of drum 62, to provide the desired diffraction pattern spacing information required to obtain the measurement of the yarn diameter.

The measurement system illustrated schematically in FIG. 10 permits the measuring and controlling of the thickness of a coating placed on a wire or a thread such as when a conductive, metallic wire 80 is coated with an insulating layer. The measuring system comprises a pair of lasers 82 and 84. The former is positioned along the path of movement of wire 80 prior to the coating operation, and the latter is positioned along the path of movement of the wire after the insulating coating has been placed thereon as the raw wire passed through a wire coating apparatus 86.

The beam from laser 82 incident on the smaller diameter wire 80 produces a diffraction pattern which is sensed at detector 88 which may be of any of the detectors illustrated in FIG. 4 - 8. The spacing of the diffraction pattern is measured and processed at computing system 90 as above, to provide a precise measurement of the diameter of the raw, uncoated wire. Similarly, the beam from laser 84 incident on the coated wire produces a second diffraction pattern which is sensed at detector 92 and processed at computer system 94 to provide a precise measurement of the diameter of the coated wire, that is, the combined diameter or thickness of the wire and the insulating coating thereon. The thickness of the insulating coating is obtained by applying the outputs of systems 90 and 94 to a computer 96 in which the smaller measurement is subtracted from the larger one, and the difference between these measurements is then divided by two.

A read-out of the accurate coating thickness measurement obtained in this manner may be used as a visual check to insure that the thickness of the coating is proper. Preferably as herein shown, the signal produced in computer 96 may be compared, as in a comparator 98, against a reference signal corresponding to the desired coating thickness. In the event the actual measured thickness is at variance with respect to its desired value, comparator 98 produces a control signal that is applied to wiring coating machine 86 to control its operation in any manner known in the art until a coating thickness of the desired value is obtained. In addition, the signal output of system 90 may also be utilized in a similar manner to control the operation of the wire-forming apparatus (not shown) to obtain precise control over the raw wire diameter.

The system of FIG. 10 may be used to advantage in applications such as the coating of teflon or plastic insulator onto a wire, or in any operation in which the diameter of small wires or yarns and their coatings is to be measured and/or controlled in the manner described.

Another technique for measuring the diameter of a yarn or a wire is schematically illustrated in FIG. 11 which the beam from laser 24 is caused to be reflected or scattered by yarn 20 toward the laser or in any direction around the yarn filament 101 of FIG. 12 to produce a diffraction image on a screen 100 rather than as in the previously described embodiments in which the light beam passes around the small diameter yarn to form the diffraction pattern on a distant screen.

The spacing between the bright (and dark) regions of the diffraction pattern obtained in this manner is again representative of the yarn diameter; that is, the expression for the yarn diameter of the system of FIG. 11 is again $d = \lambda D/\Delta Y$, where $d$ is the yarn diameter, $\lambda$ is the wavelength of laser 24, $D$ is the distance between yarn 20 and screen 100, and $\Delta y$ is the image line spacing of the diffraction pattern produced by the scattering of the laser beam by yarn 20.

The embodiment shown in FIG. 12 is a more detailed embodiment of the basic principle illustrated by the system of FIG. 11. The laser beam is reflected or scattered off yarn 20 to form a diffraction image which is reflected by a mirror 102, and focused by a lens 104 onto a mirror 106. Mirror 106 is rotated by a motor 108 in a clockwise direction as indicated by the arrows. The rotating mirror 106 causes the diffracted image to be swept across a mechanical slit 110 formed in a plate 112 onto a detector 114 of one of the types previously described herein. Detector 114 generates an electrical signal representative of the diffraction pattern. In order to increase the signal-to-noise ratio of that signal, thereby to increase the accuracy of the yarn diameter measurement, the repetitive signals produced at the output of detector 114 are processed and thereby enhanced by applying the detector output to one input of a signal averaging computer 116. The other input to computer 116 is a timing signal derived from a laser detector 118 which is produced when mirror 106 is in a position to cause a beam produced by a laser 120 to be reflected normally onto the input of detector 118. Computer 116 adds all the repetitive diffraction image signals obtained from detector 114 directly, but adds the noise signals only as the square root of the number of signals. Therefore, the signal-to-noise ratio increases only as $\sqrt{n}$, where n is the number of scanning signals added at computer 116.

The system of FIG. 12 is particularly useful in the measurement of the diameter of transparent or semitransparent yarn in which the forward diffraction pattern has a relatively low contrast between the dark and light regions. Signal averaging, as performed in the FIG. 12 embodiment, will improve the contrast ratio, thereby increasing the accuracy of the yarn measurement. Another way of increasing the contrast ratio would be to dye the yarn a dark color to make it more opaque to the light beam.

The embodiment illustrated in FIG. 13 is another technique for deriving enhanced signals representing the spacing between the peaks or valleys, or bright and dark regions, of the diffraction pattern. As in the embodiment of FIG. 12 the diffraction pattern obtained by the scattering of a laser beam by the yarn is focused by a lens 122 onto a rotating mirror 124 which in turn causes the diffraction image to be swept across a plate 126 in which a slit 128 is formed. A detector 130 is placed behind that slit and has its output connected to a voltage level detector 132 which may be a Schmitt trigger or zero-crossing detector. Voltage level detector 132 produces an output signal at times when the output signal of detector 130 exceeds a preset level. The output signal from detector 132 is applied to the input of a gate generator 134. Generator 134 produces a gate which is initiated by a signal from detector 132 and terminated by a succeeding signal from that detector. The width of the gate produced by gate generator 134 thus represents the time interval between the peaks of the diffraction image signal. That gate is applied to one input of a pulse generator 136 which receives control signals from an oscillator 138.

Oscillator 138 is also mechanically connected to a motor 140 which causes scanning mirror 124 to rotate. In operation, during the time that the gate from generator 134 is present, pulses from pulse generator 136 are counted by the counter and stored in a display counter 142. The number of pulses stored is directly proportional to the time the gate is opened and thus to the diameter of the yarn. A scan gate 144 provides a gate to counter 142 to allow counter 142 to count the pulses from pulse generator 136 for a predetermined number (e.g., 100) of scans of the diffraction pattern, and to display the count or use the count signal to generate a control signal as indicated above to control the yarn formation process. The use of a multiple number of scans improves the accuracy of the yarn diameter measurement by increasing the accuracy of measurement of the diffraction pattern spacing.

In the measurement system of FIG. 13, the accuracy of measurement is substantially independent of the lateral movement of the yarn across the laser beam so long as the yarn movement is slow as compared to the time of the scan.

FIG. 14 illustrates the application of the concept of the present invention to test the sharpness of an edge during the process of manufacturing a sharp-edged object such as a knife, razor blade or the like, or pointed objects such as needles, or the like, and to control the sharpness of the edge during that process. As shown in FIG. 14, a beam of monochromatic light produced by a laser 24 is passed through an opening 146 formed in a screen 148 and is caused to be incident upon the sharp edge 150 such as the edge of a knife. The interference pattern produced thereby is reflected or scattered off onto screen 148 and is there observed and analyzed to test the sharpness of the edge.

A typical diffraction pattern for a sharp edge is shown in FIG. 15 in which the orientation of the knife edge is shown by the vertical broken lines 152. The diffraction pattern obtained is illustrated by the intense horizontal narrow central line 154 with several less although well-defined lines symmetrically formed both above and below the intense central line. For a dull edge the diffraction pattern obtained is that illustrated in FIG. 16 in which the diffraction patterns appear as a random, unsymmetrical distribution of dark lines formed on screen 148. The duller the edge being tested the wider will be the spread or the random nature of the diffraction pattern observed.

This sharpness testing technique could be used to provide a visual inspection of the sharpness of the edge to aid in the blade sharpening operation as a quality control test. The process could also be used in a blade fabricating process or the like as a feedback and control element by comparing the observed diffraction pattern against a reference, well-defined pattern of the type that would be produced by a sharp edge. The comparison of the actual and reference diffraction patterns may be used to control the blade-sharpening operation to ensure that all blades fabricated have the desired degree of sharpness. Alternatively, when a dull edge is sensed the sharpening process may be temporarily halted to discover the reason for the improper forming of the edge. This procedure could also be used to insure that the edge is properly oriented during a sharpening operation since the bright lines on the diffraction pattern, formed when the laser beam is incident on the edge, are precisely perpendicular to the orientation of the blade edge.

The apparatus and system of the present invention thus provide a highly accurate and reliable means for determining the thickness or diameter of a fine object such as a wire, filament or strand of yarn. The method requires no physical contact of the measuring system and the filament under test, and thus can be used extremely fine filaments without causing damage thereto, such as in the conventional methods using mechanical feeler contacts. Furthermore, the optical measurement system of the present invention is relatively simple in nature while still providing highly accurate measurement data.

The system and method of the invention can be used either solely to measure the diameter of the filament, or, in addition, can be used to provide signals for controlling the formation of the filaments in conjunction with suitable feedback and control circuitry, thereby to maintain the diameter of the filament at a precise predetermined value.

The basic principles of the invention have been illustrated in several embodiments showing various means for measuring the spacing between the bright and dark regions of the diffraction pattern formed when the laser beam passes around the small diameter filament. In another version of the invention the laser beam may be caused to be scattered or reflected off the yarn onto the diffraction plane to form the diffraction pattern.

Thus, while several embodiments of the present invention have been herein specifically described, it will be apparent that variations may be made therein without departing from the spirit and scope of the invention.

I claim:

1. Apparatus for measuring the diameter of a fine filament, wire, or the like comprising first laser means for irradiating the filament with a beam of light, first detecting means, scanning means for directing the diffraction pattern having alternating dark and light portions produced when said filament is irradiated by said beam to said first detecting means, signal averaging means having one input coupled to the output of said first detecting means, second laser means directing a beam onto said scanning means, and second detecting means for producing a timing signal when said beam from said second laser beam is reflected from said scanning means normally to said second detecting means, the output of said second detecting means being coupled to a second input of said signal averaging means.

2. The apparatus of claim 1, further comprising a plate having a narrow slit interposed between said scanning means and said first detecting means.

* * * * *